(12) United States Patent
Wall et al.

(10) Patent No.: US 6,522,030 B1
(45) Date of Patent: Feb. 18, 2003

(54) MULTIPLE POWER GENERATOR CONNECTION METHOD AND SYSTEM

(75) Inventors: Simon R. Wall, Thousand Oaks, CA (US); Mark G. Gilbreth, Simi Valley, CA (US); Joel B. Wacknov, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/624,315

(22) Filed: Jul. 24, 2000

Related U.S. Application Data

(60) Provisional application No. 60/199,307, filed on Apr. 24, 2000.

(51) Int. Cl.[7] .................................................. H02J 1/00
(52) U.S. Cl. .............................. 307/43; 307/52; 307/80; 307/82; 307/57; 307/58
(58) Field of Search ........................... 307/43, 52, 64, 307/65, 80, 82, 85, 68, 87, 57, 58

(56) References Cited

U.S. PATENT DOCUMENTS

| | | | |
|---|---|---|---|
| 3,621,365 A | 11/1971 | Beck et al. | |
| 3,675,037 A | 7/1972 | Hamilton | |
| 3,846,693 A | 11/1974 | Compoly et al. | |
| 4,114,048 A | 9/1978 | Hull et al. | |
| 4,149,233 A | 4/1979 | Nagano | |
| 4,270,165 A | 5/1981 | Carpenter et al. | |
| 4,276,590 A | 6/1981 | Hansel et al. | |
| 4,425,613 A | 1/1984 | Shelly | |
| 4,733,341 A | 3/1988 | Miyazawa | |
| 4,886,981 A | 12/1989 | Lentini et al. | 307/87 |
| 4,924,170 A | 5/1990 | Henze | |
| 5,177,676 A | 1/1993 | Inam et al. | |
| 5,191,519 A | 3/1993 | Kawakami | |
| 5,257,180 A | 10/1993 | Sashida et al. | |
| 5,436,512 A | 7/1995 | Inam et al. | |
| 5,559,421 A | 9/1996 | Miyakawa | 722/58 |
| 5,596,492 A | 1/1997 | Divan et al. | |
| 5,616,968 A | 4/1997 | Fujii et al. | 307/66 |
| 5,745,356 A | 4/1998 | Tassitino, Jr. et al. | |
| 5,757,634 A | 5/1998 | Ferens | |
| 5,975,736 A | * 11/1999 | Simmons et al. | 364/132 |
| 6,134,124 A | * 10/2000 | Jungris et al. | 363/34 |
| 6,166,455 A | * 12/2000 | Li | 307/43 |
| 6,194,794 B1 | * 2/2001 | Lampe et al. | 307/68 |

FOREIGN PATENT DOCUMENTS

| | | |
|---|---|---|
| EP | 524398 A2 | 1/1993 |
| EP | 680139 A1 | 11/1995 |

\* cited by examiner

*Primary Examiner*—Stephen W. Jackson
*Assistant Examiner*—Robert L. DeBerandinis
(74) *Attorney, Agent, or Firm*—Paul D. Chancellor; Sterne, Kessler, Goldstein & Fox PLLC

(57) ABSTRACT

A method and system for connecting a plurality of power generators, each having an electrical power converter output and adjustable output voltage magnitude and frequency, with at least one digital communications bus to provide synchronization and load sharing. One of the plurality of power generators is designated a master unit and the remainder are designated as slave units.

31 Claims, 6 Drawing Sheets

MULTIPLE POWER GENERATOR CONNECTION METHOD AND SYSTEM

REFERENCE TO RELATED APPLICATION

This application claims the benefit of U.S. application Ser. No. 09/359,815, filed Jul. 23, 1999, now U.S. Pat. No. 6,194,794, issued Feb. 27, 2001, and the benefit of United States Provisional Application No. 60/199,307, filed Apr. 24, 2000.

TECHNICAL FIELD

This invention relates to the general field of power generators, and more particularly to an improved method and system for connecting multiple power generators such as turbogenerators or fuel cells.

BACKGROUND OF THE INVENTION

A power generator, such as a turbogenerator with a shaft mounted permanent magnet motor/generator, can be utilized to provide electrical power for a wide range of utility, commercial and industrial applications. While an individual permanent magnet turbogenerator may only generate 20 to 100 kilowatts, powerplants of up to 10 megawatts or greater are possible by linking numerous permanent magnet turbogenerators together. Peak load shaving power, standby power, and remote location (standalone) power are just some of the potential applications for which these lightweight, low noise, low cost, environmentally friendly, and thermally efficient units can be useful.

The conventional power control system for a turbogenerator utilizes an electronic power converter to produce constant frequency, three phase electrical power that closely approximates the electrical power produced by utility grids. Key aspects of such a power generation system are availability and reliability.

In standalone operation, the turbogenerator is not connected to a public utility grid network. Thus, the standalone turbogenerator must be sized to meet the largest conceivable load power requirement. To oversize the turbogenerator, however, typically increases the cost and reduces the efficiency of the installation.

Clearly, there is a benefit to have a range of turbogenerators with a small power capacity increment between each turbogenerator. While a range of power capacities will provide flexibility in power capacity, much of the benefits of mass production of the turbogenerator are lost. By producing a small range of turbogenerators with a wide increment of power capacity, and the capability for parallel connecting two or more generators, a wide spectrum of load power requirements can be accommodated with a small range of standalone turbogenerators that are mass produced.

In addition to economic advantages, the use of several parallel turbogenerators can offer a number of operational advantages. Some redundancy to turbogenerator failure is obtained since the failure of one or more turbogenerators will still leave one or more turbogenerators able to provide for at least some fraction of the total load requirement. In contrast, should a single large turbogenerator fail, no power can be supplied to the load until the failure is corrected.

Further, since turbogenerator combustion engines typically have a limited power range where they operate close to maximum efficiency and with minimum pollutant emissions, a single large turbogenerator can have low efficiency and high emissions when it is operated at a power load requirement below its most desirable operating region. With a parallel connection of smaller turbogenerators, some of the turbogenerators can be deliberately turned off to keep the remaining turbogenerators running in the operating region that provides maximum efficiency and minimum emissions.

Parallel operation of generators has been utilized previously in electricity supply networks. In most cases, the generators are based on synchronous electric machines which are driven by an engine running at a speed synchronous with the other generators in the network. Load sharing is often managed by controlling the excitation magnetic field used in each generator and is facilitated by the relatively high output impedance of a synchronous electric machine (typically 5% to 20% of the ratio of rated voltage to rated current). These devices have the capability to supply currents considerably in excess of the steady state rating for short periods of time which allows each synchronous generator time to adjust to changes in the load balance without shutting down due to excess current.

While synchronization is not a real problem with synchronous electric machines, it is more difficult where the generators operate at variable speeds and an electronic power converter is utilized to supply a regulated output voltage and frequency. Power converter characteristics, which typically have lower output impedance and can deliver less current in excess of the steady state rating, make them inherently more difficult to connect in parallel than synchronous machines. For example, the electronic power converter used in a turbogenerator may have output impedance of less than 4% and is not capable of supplying current much in excess of the steady state rating.

In order to provide for load sharing of parallel connected turbogenerators in both steady state and transient load conditions, it is extremely important to operate parallel connected power converters at the correct voltage, frequency, and phase angle. The magnitude and phase angle of the output currents in all of the parallel connected power converters must be similar under both steady state and transient load conditions and all of the power converters must operate at the same output frequency.

Prior art solutions to this problem generally fall into two categories; those systems where some form of signal level connection are used to exchange load sharing information between parallel connected power converters, and those systems which do not have this type of signal level connections between parallel connected power converters.

When signal level communications are used, they are typically employed to provide load current or power sharing information, transmitted in analog form as a voltage or current level. Often this information is the average output current or power level, where this average is taken across all of the parallel connected power converters. Signal level connections have also been used to provide frequency and phase synchronization information between the power converters or from some master control device.

When no signal level communications are used, each power converter is controlled in a manner similar to previous solutions for the parallel connection of synchronous generators. Each unit contains a control system that sets the output frequency and internal voltage magnitude in accordance with the measured current magnitude and phase angle with respect to the measured output voltage angle. These schemes do not offer as precise load sharing as those where additional load share information is passed using signal connections between power converters, but have the advantage of dispensing with the cost and reliability concerns associated with signal level connections.

There are also existing solutions that help increase the output impedance characteristics of parallel connected power converters to assist with load sharing during load transients. These schemes either involve the insertion of actual impedance in series with the output of each power converter or involve the use of feedback on the output current to modify the output voltage in accordance with a desired impedance characteristic. The most commonly applied technique is the use of negative current feedback to provide for a resistive output characteristic. In this case, the output voltage of the power converter droops as the input current increases. This voltage droop method provides for load current sharing in the steady state and under transient conditions. Among its disadvantages, however, is that the output voltage regulation/control is poor compared with other load sharing methods and the output voltage waveforms become distorted when supplying non-linear loads (which require a non-sinusoidal current).

SUMMARY OF THE INVENTION

The invention is directed to connecting a plurality of power generators, each having an electrical power converter output and adjustable output voltage magnitude and frequency, with at least one digital communications bus to provide synchronization and load sharing. One of the plurality of power generators is designated a master unit and the remainder are designated as slave units. The digital bus(es) passes voltage magnitude correction information, voltage harmonic correction information, and synchronization information from the master unit to the slave units.

BRIEF DESCRIPTION OF THE DRAWINGS

Figure 1:
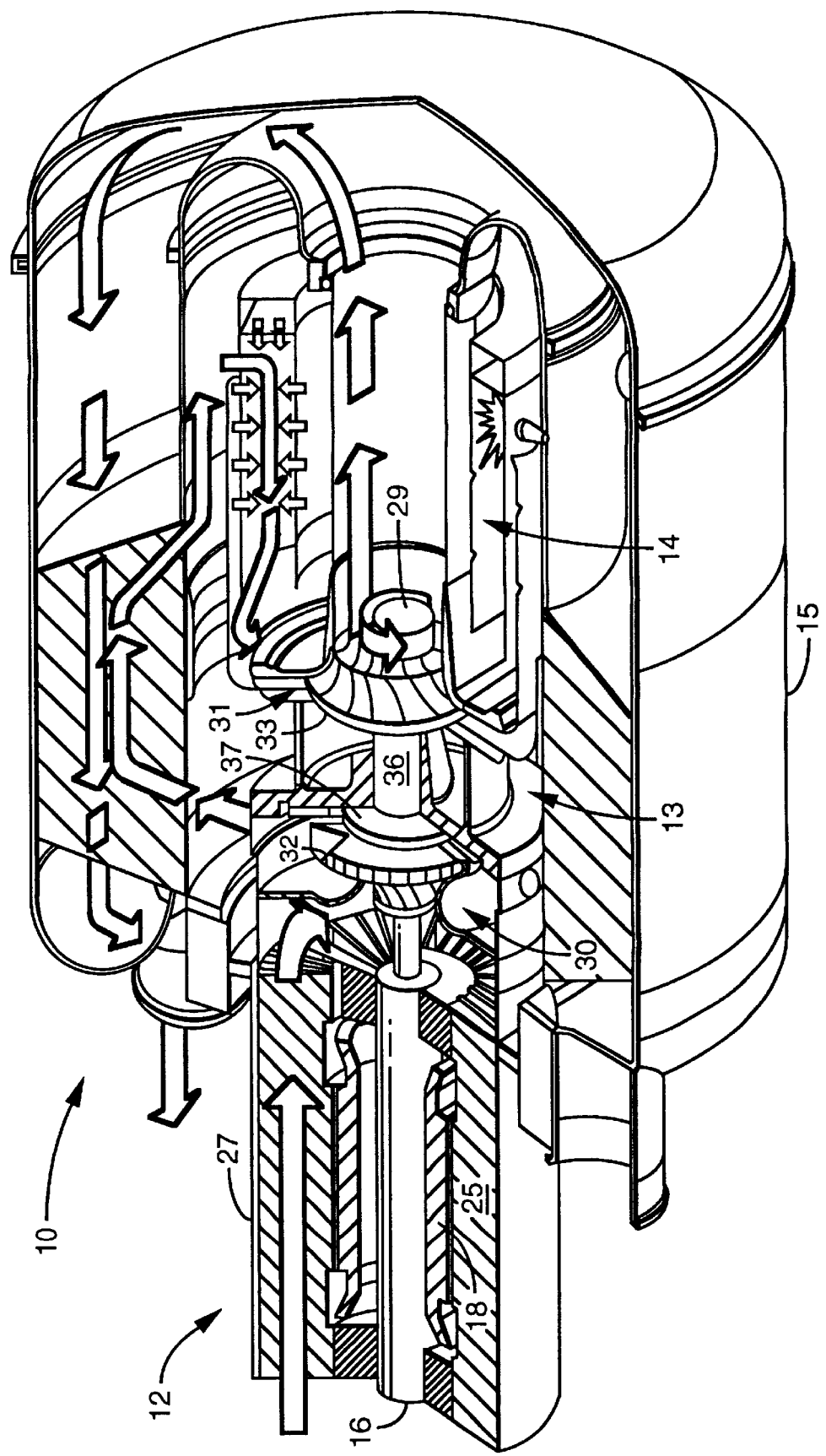
Figure 2:
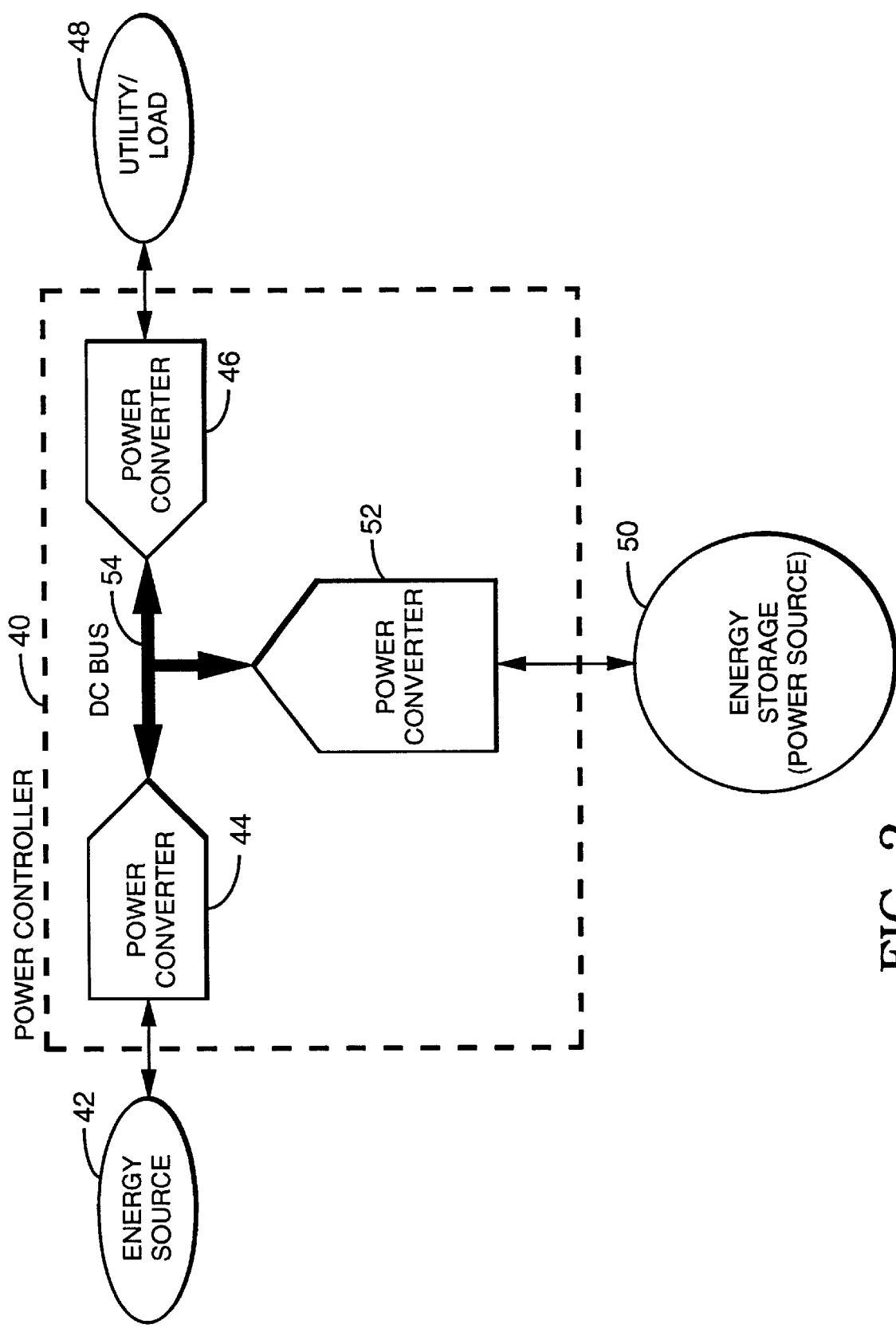
Figure 3:
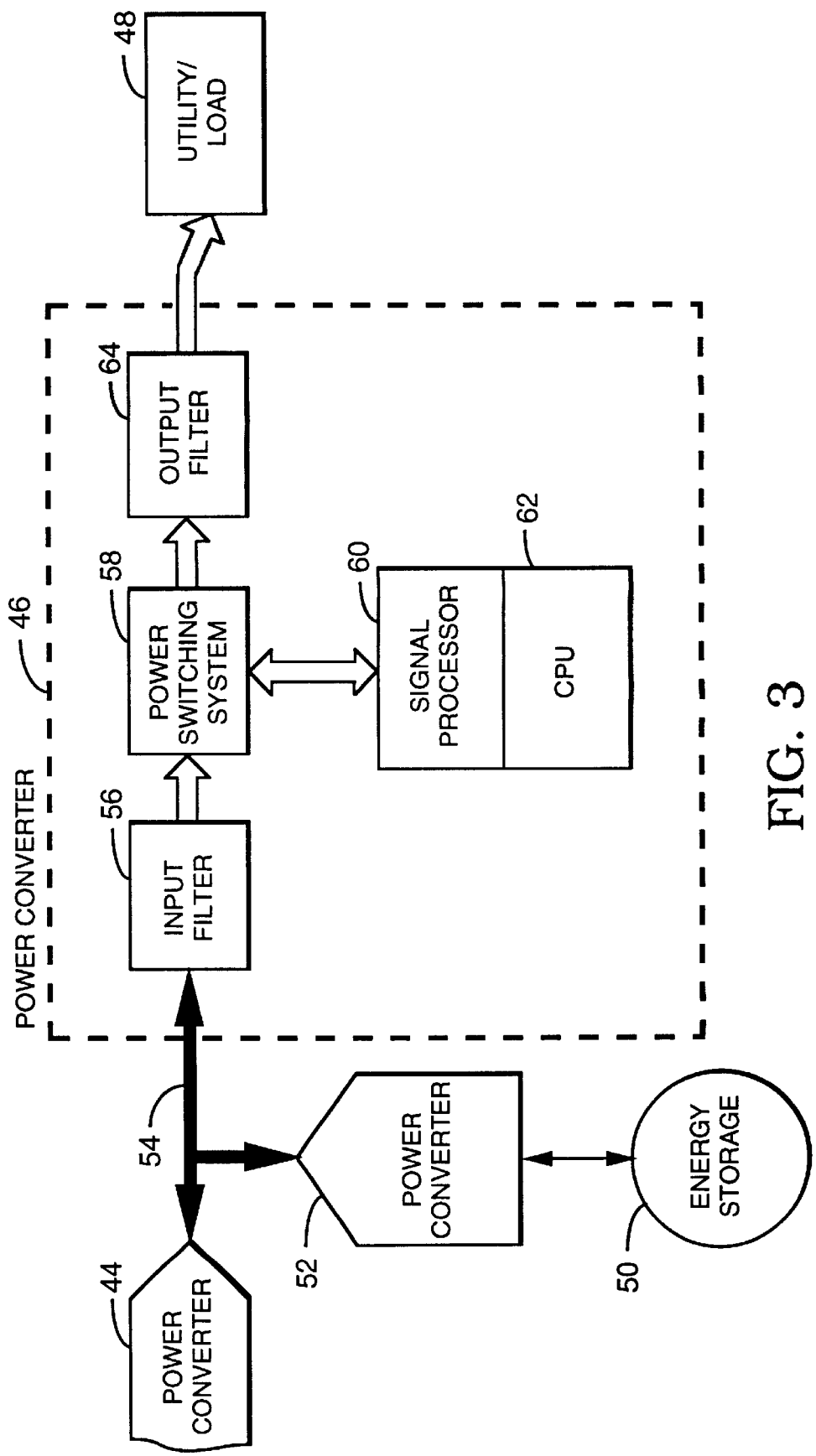
Figure 4:
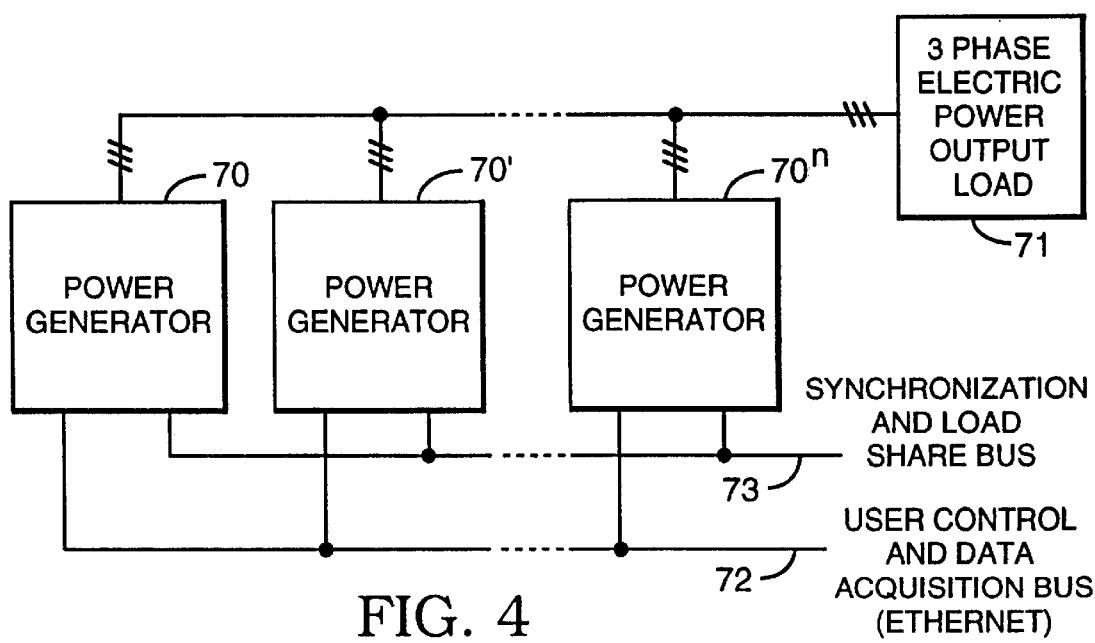
Figure 5:
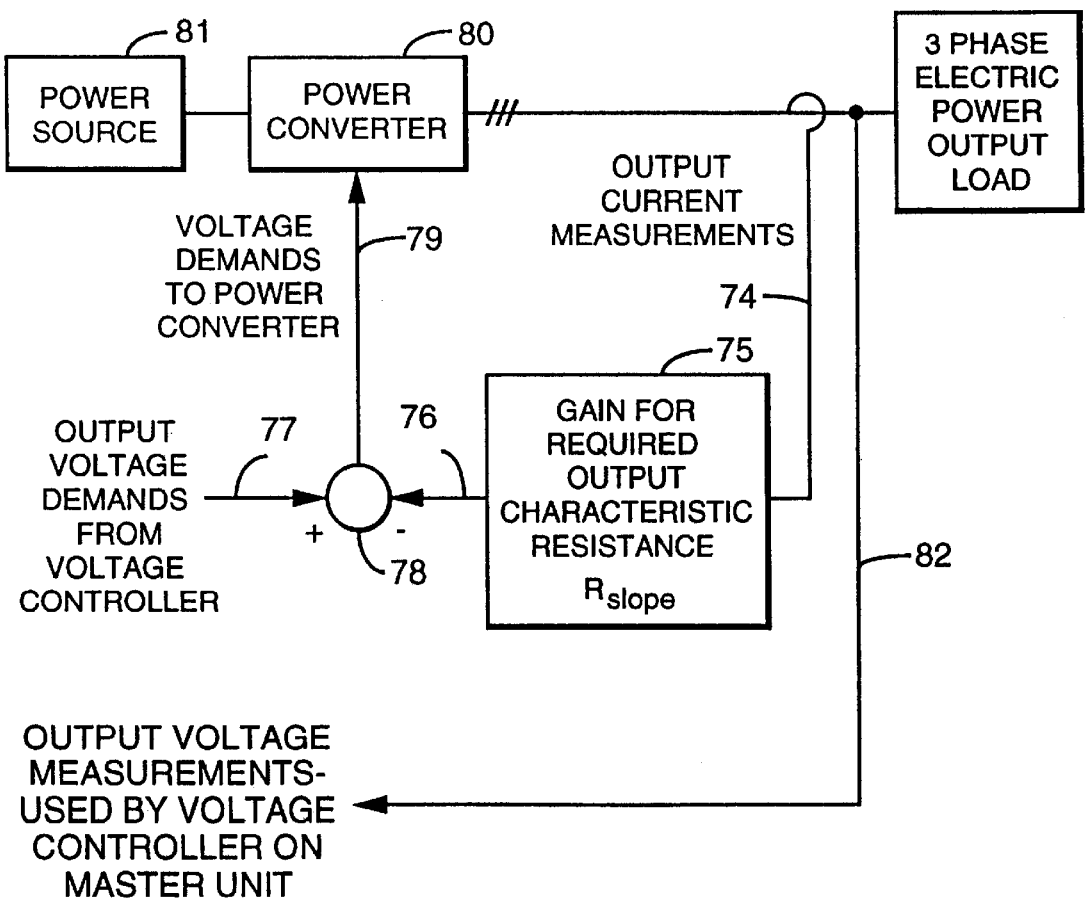
Figure 6:
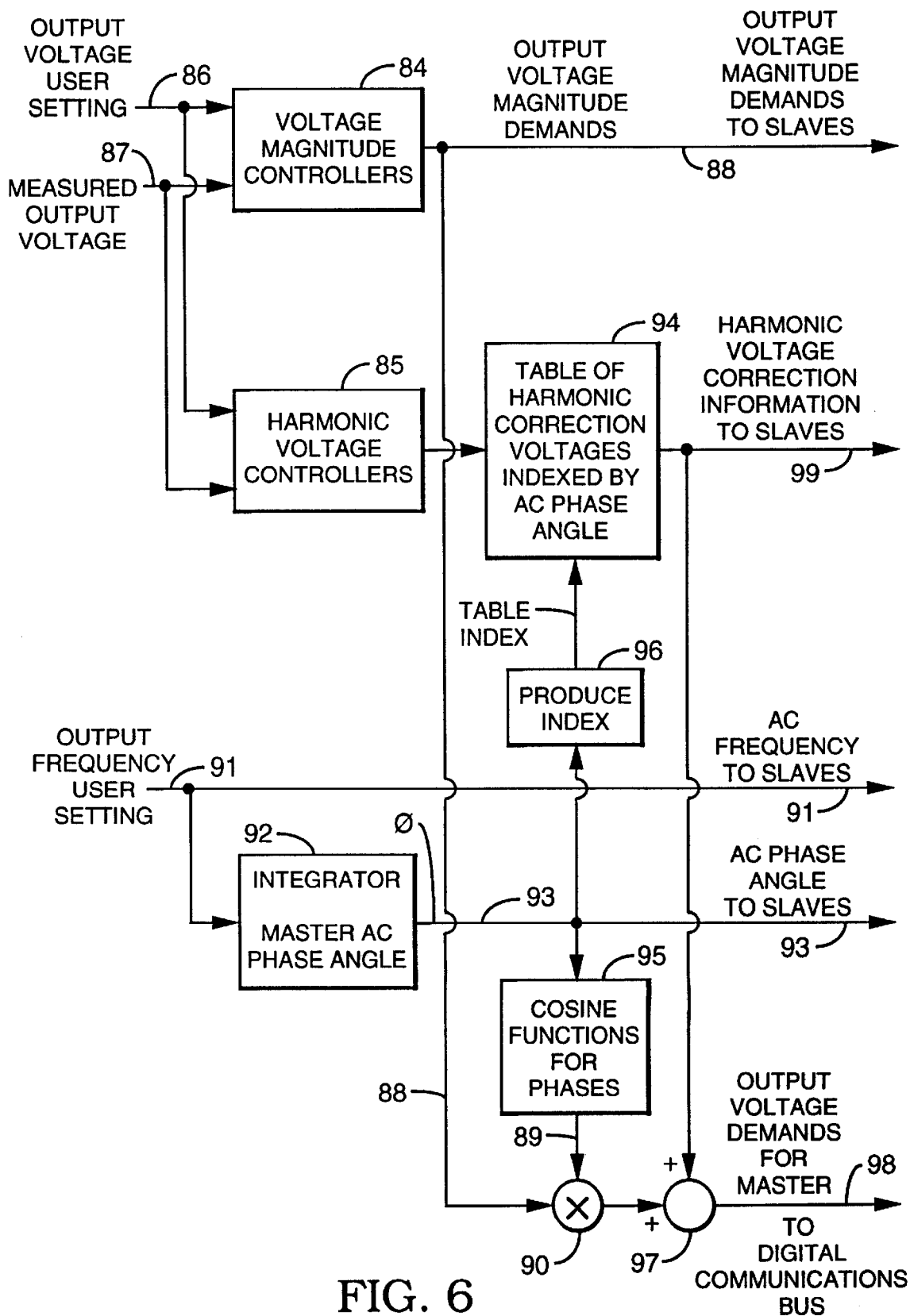
Figure 7:
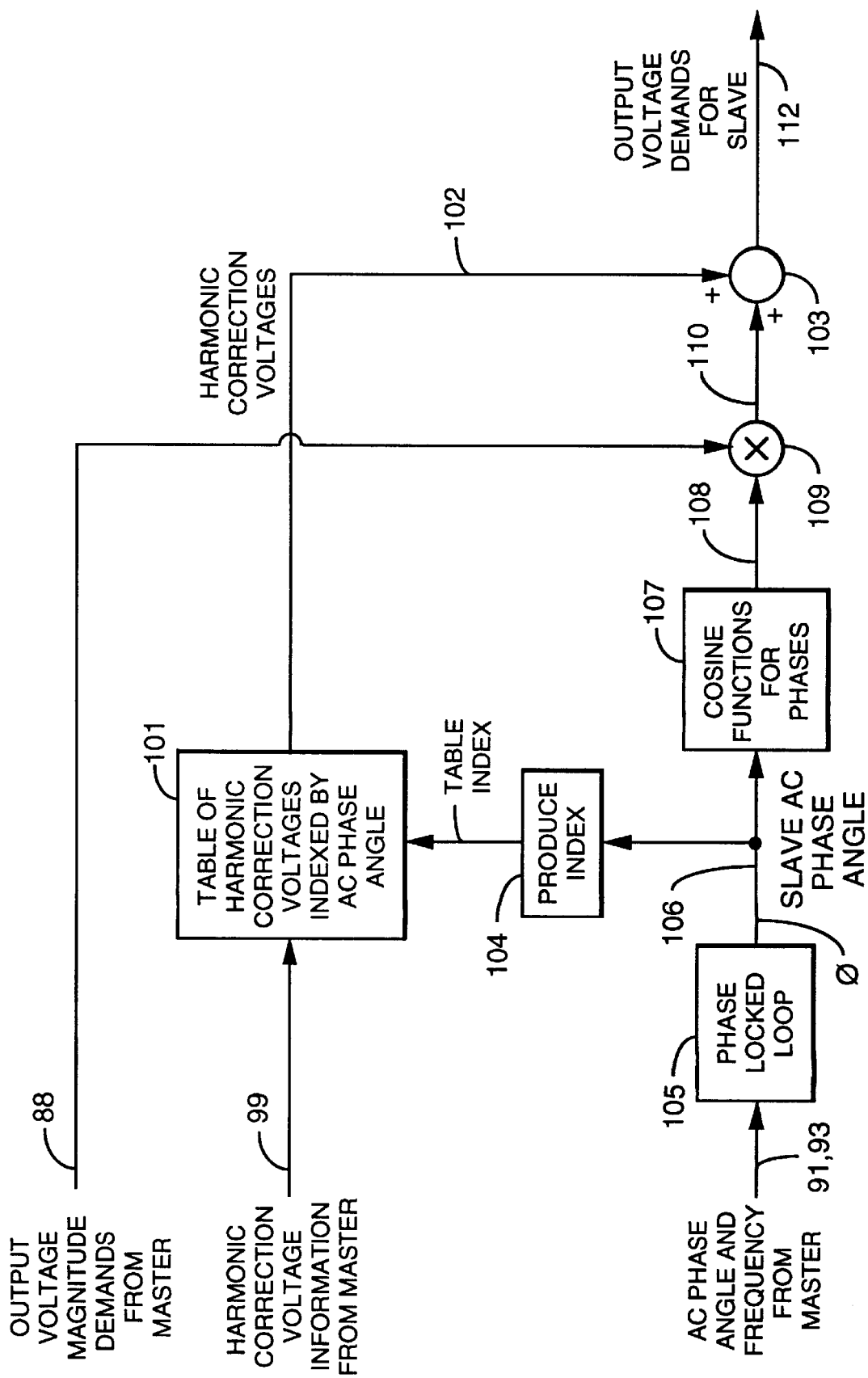

Having thus described the present invention in general terms, reference will now be made to the accompanying drawings in which:

FIG. 1 is a perspective view, partially cut away, of a turbogenerator for use in the multiple power generator connection method and system of the present invention;

FIG. 2 is a detailed block diagram of a power controller for use with the turbogenerator of FIG. 1;

FIG. 3 is a detailed block diagram of a power converter of the controller of FIG. 2;

FIG. 4 is a schematic diagram illustrating the parallel interconnection of a plurality of turbogenerators with digital communication buses;

FIG. 5 is a schematic diagram illustrating the power converter impedance control;

FIG. 6 is a schematic diagram illustrating output voltage control for the master turbogenerator unit; and FIG. 7 is a schematic diagram illustrating output voltage control for the slave turbogenerator units.

DETAILED DESCRIPTION OF THE PREFERRED EMBODIMENTS

A permanent magnet turbogenerator/motor 10 is illustrated in FIG. 1 as an example of a turbogenerator/motor for use with the connection method and system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet generator/motor stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet motor stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37.

The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face of the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine wheel 33. The expanded turbine exhaust gases are then passed through the recuperator 15 before being discharged from the turbogenerator/motor 10.

The system has a steady-state turbine exhaust temperature limit, and the turbogenerator operates at this limit at most speed conditions to maximize system efficiency. This turbine exhaust temperature limit is decreased at low ambient temperatures to prevent engine surge.

Referring to FIGS. 2 and 3, the power controller 40, which may be digital, provides a distributed generation power networking system in which bi-directional (i.e. reconfigurable) power converters are used with a common DC bus 54 for permitting compatibility between one or more energy components. Each power converter 44, 46, and 52 operates essentially as a customized, bi-directional switching converter under the control of main CPU 62, which uses signal processor 60 to perform its operations. Main CPU 62 provides both local control and sufficient intelligence to form a distributed processing system. Each power converter 44, 46, and 52 is tailored to provide an interface for a specific energy component to DC bus 54. Main CPU 62 controls the way in which each energy component 42, 48, and 50 sinks or sources power and DC bus 54 is regulated at any time. In particular, main CPU 62 reconfigures the power converters 44, 46, and 52 into different configurations for different modes of operation. In this way, various energy components 42, 48, and 50 can be used to supply, store and/or use power in an efficient manner.

The energy components, as shown in FIG. 2, include an energy source 42 such as the turbogenerator 10, utility/load 48, and storage device 50 such as a battery. A detailed block diagram of power converter 46 in the power controller 40 of FIG. 2 is illustrated in FIG. 3. Power converter 46 includes input filter 56, power switching system 58, output filter 64, signal processor 60 and main CPU 62.

In operation, DC from the DC bus 54 is supplied to input filter 56 in power converter 46 with the filtered DC then applied to power switching system 58 which may conveniently be a series of insulated gate bipolar transistor (IGBT) switches operating under the control of signal processor 60 which is controlled by main CPU 62. The AC output of the power switching system 58 is applied to output filter 64 which then applies the filtered AC to utility/load 48.

With a turbogenerator 10 as the energy source 42, a conventional system regulates turbine speed to control the output or bus voltage. In the power controller 40, the bidirectional controller functions independently of turbine speed to regulate the bus voltage.

FIG. 2 generally illustrates the system topography with the DC bus 54 at the center of a star pattern network. In general, energy source 42 provides power to DC bus via power converter 44 during normal power generation mode. Similarly, during power generation, power converter 46 converts the power on DC bus 54 to the form required by utility/load 48. During utility start up, power converters 44 and 46 are controlled by the main processor to operate in different manners. For example, if energy is needed to start the turbogenerator 10, this energy may come from load /utility 48 (utility start) or from energy source 50 (battery start). During a utility start up, power converter 46 is required to apply power from utility 48 to DC bus 54 for conversion by power converter 44 into the power required by the turbogenerator 10 to start up. During utility start, the turbogenerator 10 is controlled via power converter 44 to maintain the turbine speed. Power converter 46 regulates DC voltage ($V_{DC}$) on DC bus 54 using power from utility 48.

Similarly, in a battery start, the power applied to DC bus 54 from which turbogenerator 10 may be started, may be provided by energy storage 50. Energy storage 50 has its own power conversion circuit in power converter 52, which regulates $V_{DC}$ on DC bus 54 and supplies power to start turbogenerator 10.

A more detailed description of the power controller can be found in U.S. patent application Ser. No. 207,817, filed Dec. 8, 1998 by Mark G. Gilbreth et al, entitled "Power Controller", assigned to the same assignee as this application and hereby incorporated by reference.

As illustrated in FIG. 4, a number of three phase AC power turbogenerators 70, 70'. . . $70^n$ are connected in parallel at their output voltage terminals and used to supply an electrical load 71. These turbogenerators 70, 70'. . . $70^n$ have an electronic power converter output where the output voltage magnitude and frequency can be adjusted.

The turbogenerators 70, 70'. . . $70^n$ are connected together by two digital communications buses 72, 73 as depicted in FIG. 4. An Ethernet bus 72 is used to transmit information such as mode control and user settings between turbogenerators 70, 70'. . . $70^n$ and also provides a means for the operator to adjust parameters on or acquire data from any on of the turbogenerators 70, 70'. . . $70^n$ from a single point of access. This point of access can be the display fitted to any one of the turbogenerators 70, 70'. . .$70^n$, a computer connected to any one of the turbogenerators 70, 70'. . . $70^n$, or a dedicated device attached to the Ethernet bus 72. A digital serial communications interface bus 73, such as a RS485 bus, is used to transmit information needed by the turbogenerators 70, 70'. . . $70^n$ to share the load evenly between each of the turbogenerators 70, 70'. . . $70^n$ and to provide for frequency and phase angle synchronization.

The system of parallel turbogenerators 70, 70'. . . $70^n$ is operated in a master/slave(s) configuration. During operation, one of the turbogenerators 70, 70'. . . $70^n$ is designated the master and the others are designated slaves. The assignment of a master can be made when the units are built, commissioned, or dynamically when the system is started. Should the master ever develop a fault, it will be shut down and one of the slaves will be promoted to master. Faults can be detected by either the master or the slave(s) and a slave can promote itself to master in the absence of communications from the master. The master turbogenerator and master power converter do not have to be the same unit.

Since there will be inevitable differences in the construction of the turbogenerators 70, 70'. . . $70^n$, each individual unit will produce a slightly different output voltage when receiving the same output voltage demand. When several turbogenerators 70, 70'. . . $70^n$ are connected in parallel, these voltage differences may result in undesirable circulating currents between the turbogenerators 70, 70'. . . $70^n$, with the magnitude of these circulating currents being inversely proportional to the output impedance of the turbogenerators 70, 70'. . . $70^n$.

In order to facilitate load sharing between the turbogenerators 70, 70'. . . $70^n$ during both steady state and transient conditions, the effective output impedance of the turbogenerators 70, 70'. . . $70^n$ is increased utilizing negative feedback on the output current. This voltage droop mechanism is illustrated in FIG. 5. The output current for each phase is measured 74 and is multiplied by a gain factor equal to the required output resistance, $R_{slope}$ 75. The resulting product 76 is subtracted from the power converter voltage demand 77 for that phase in summing device 78 which provides a voltage demand signal 79 to power converter 80 having power source 81. Output voltage measurements 82 are provided to the voltage controller on the master unit. The procedure is repeated for each of the other three phases.

The effective output impedance can be increased from a predominately inductive value of less than 4% to a predominately resistive value of greater than 8%. With a high quality turbogenerator, the spread in output voltage for the same output voltage demand, over a production batch, can be better than +/–0.5%. Without the increase in effective output impedance, circulating currents of up to 13% of the rated current can be expected. With the increase in effective output impedance, circulating current of no more than 6% of the rated current should be expected. By applying output current droop as described with respect to FIG. 5, the requirement that the turbogenerators 70, 70'. . . $7^n$ operate with similar output current magnitude and phase angle can be accomplished.

Without correction, the voltage droop technique of load sharing can lead to poor output voltage regulation and to high output voltage distortion when supplying non-linear loads. The master controller can utilize feedback controllers to calculate the required correction to the output voltage demands to provide for excellent regulation and low distortion. These corrections are broadcast on the RS485 bus 73 to the slave units, which then also apply the correction to the output voltage demands.

The output voltage control scheme for the master unit is depicted as a block diagram in FIG. 6. Voltage magnitude controllers 84 are used on each phase to provide for excellent regulation under steady state conditions. The purpose of each magnitude controller 84 is to calculate the necessary correction to the output voltage magnitude demand to force the magnitude or RMS value of the measured output voltage to converge towards the user setting for the output voltage magnitude or RMS value. These controllers 84 could have many structures not limited to proportional, integral, derivative forms or any combinations of these types.

In the master turbogenerator unit, harmonic voltage controllers 85 are also used to provide for low harmonic distortion under steady load conditions. The purpose of each harmonic voltage controller 85 is to calculate the necessary correction to the output voltage demand to force the measured output voltage for that phase to converge towards a sinusoidal template. These controllers 85 can likewise have many structures, but will typically have an array of memory locations that, through a process of feedback control, contain the harmonic correction voltages as a function of AC phase angle.

Each of the voltage magnitude controllers 84 and harmonic voltage controllers 85 receive an output voltage user setting 86 and a measured output voltage 87. The voltage magnitude controllers 84 provide output magnitude voltage demands 88 that are used by multiplier 90 and are also fed to the slaves via bus 73. The output frequency user setting 91 is fed to master AC phase angle integrator 92 and also to the slave units via bus 73. The integrator 92 produces AC phase angle 93 and table index 94 (in produce index 96) and cosine functions for each phase 95. For phase 1, it is the cosine of $\theta$, for phase 2 the cosine of $(\theta-120°)$ and for phase 3 the cosine of $(\theta+120°$ or $\theta-240°)$. The AC phase angle signal 93 is fed to the slave units via bus 73. The summing device 97 receives signals from multiplier 90 and the harmonic correction voltages 99 to provide output voltage demand signals 98 for the master unit. The harmonic voltage correction information signals 99 are provided to the slave units via the bus 73.

Each voltage magnitude controller 84 is implemented as an integral controller in combination with a feedforward of the user setting from output voltage magnitude. The integral portion of the controller acts on the error between the user setting for output voltage magnitude and an estimate of the measured voltage magnitude formed from the measured output voltage. A more detailed description of the harmonic voltage control can be found in U.S. patent application Ser. No. 265,729 filed Mar. 9, 1999 by Simon R. Wall entitled "Apparatus and Method for Distortion Compensation, assigned to the same assignee as this application and herein incorporated by reference.

In the master unit, the output voltage magnitudes 88 and harmonic voltage corrections 99, plus frequency 91 and phase angle 93, at the present AC phase angle are broadcast to the slave units on a regular basis using digital bus 73, e.g. sent 1250 times in each second and several times within an AC period. The slave units receive and process this information as shown in FIG. 7.

Harmonic correction voltage signals 99 from the master unit are used to construct harmonic correction table 101, which provides harmonic correction voltages 102 for each phase to summing device 103. AC phase angle and frequency signals 91 and 93 from the master unit are provided to phase locked loop 105 which provides a slave AC phase angle signal 106, table index 101 (through produce index 104), and cosine functions for phases 107 which in turn provides signal 108 to multiplier 109 which provides signal 110 to summing device 103. Multiplier 109 also receives output voltage demand signals 88 from the master unit. Slave output voltage demand signals 112 are provided by summing device 103.

In both the master and slave units, the output voltage demand for each phase is formed as the product of the cosine of the appropriate phase angle and the output voltage magnitude demand which is then summed with the contents of the harmonic distortion correction table at the location indexed by the phase angle. This process is shown in the block diagrams of FIGS. 6 and 7. The output voltage demands are further modified by the appropriate voltage droop and sent to the power converter as depicted in FIG. 5.

The master turbogenerator sets the frequency and phase angle of the AC output voltage from a user frequency setting 91. In the master unit the phase angle is formed by integration of the frequency setting provided by the user. The master unit broadcasts the frequency and phase angle information to the slave units on a regular basis using the digital bus 73, e.g. 1250 times in each second. In the slave units, phased locked loops ensure that the slave units operate in synchronization with the master unit by adopting the same frequency and phase angle for output voltage. The phase locked loops in the slave units are compensated to allow for the communications delay between the master and slaves. In this way, the present invention accomplishes the requirement that the turbogenerators all operate at the same frequency. The frequency and phase angle generation techniques are depicted for the master unit in FIG. 6 and for the slave units in FIG. 7.

The digital communications interface(s) provide for the exchange of many different operating parameters between parallel connected turbogenerators using only a few signal level interconnections. The interface is used to provide for both synchronization and load sharing between the parallel connected turbogenerators. This same interface also enables the user to control system settings on any one of the turbogenerators or to acquire and record data from any one of the turbogenerators, using a single point of entry to network the turbogenerators.

To provide for load sharing in steady state and transient load conditions, a resistive output characteristic is imposed on the output power converter of each turbogenerator. This is accomplished using negative feedback on the output current. One of the parallel connected turbogenerators is selected to calculate corrections for the voltage droop and distortion caused by resistive output characteristics. This master unit uses the digital communications interface to broadcast these corrections to the remainder of the parallel connected turbogenerators. In this manner, an output voltage waveform with low distortion and excellent voltage regulation is achieved. Should the master unit fail for any reason, one of the other units can automatically take over the role of master.

While specific embodiments of the invention have been illustrated and described, it is to be understood that these are provided by way of example only and that the invention is not to be construed as being limited thereto but only by the proper scope of the following claims.

What we claim is:

1. A method of connecting a plurality of power generators, each power generator having an electronic power converter output where the output voltage magnitude and frequency are adjustable, comprising:

connecting in parallel the output voltage terminals of each of the plurality of power generators; and connecting each of the plurality of power generators to at least one digital communications bus to provide synchronization and load sharing between the plurality of power generators.

2. The method of claim 1 and in addition;

designating one of the plurality of power generators as a master unit and the remainder of the plurality of power generators as slave units to the master unit.

3. The method of claim 2 wherein the power generators are permanent magnet turbogenerators.

4. The method of claim 2 and in addition;

using one of the digital communications buses to pass voltage magnitude correction information calculated by the master unit to the slave units where the voltage correction is used to improve the output voltage regulation of the plurality of power generators.

5. The method of claim 2 and in addition;

using one of the digital communications buses to pass voltage harmonic correction information calculated by the master unit to the slave units where the voltage harmonic correction is used to reduce the output voltage distortion of the plurality of power generators.

6. The method of claim 2 and in addition;

using one of the digital communications buses to pass voltage magnitude correction information calculated by the master unit to the slave units where the voltage correction is used to improve the output voltage regulation of the plurality of power generators; and using one of the digital communications buses to pass voltage harmonic correction information calculated by the master unit to the slave units where the voltage harmonic correction is used to reduce the output voltage distortion of the plurality of power generators.

7. The method of claim 2 and in addition;

employing an output impedance shaping control on the plurality of power generators where the output voltage is reduced with increasing output current.

8. The method of claim 2 and in addition;

employing an output impedance shaping control on the plurality of power generators where the output voltage is reduced with increasing output current; and using one of the digital communications buses to pass voltage magnitude correction information calculated by the master unit to the slave units where the voltage correction is used to improve the output voltage regulation of the plurality of power generators.

9. The method of claim 2 and in addition;

employing an output impedance shaping control on the plurality of power generators where the output voltage is reduced with increasing output current; and using one of the digital communications buses to pass voltage harmonic correction information calculated by the master unit to the slave units where the voltage harmonic correction is used to reduce the output voltage distortion of the plurality of power generators.

10. The method of claim 2 and in addition;

employing an output impedance shaping control on the plurality of power generators where the output voltage is reduced with increasing output current;

using one of the digital communications buses to pass voltage magnitude correction information calculated by the master unit to the slave units where the voltage correction is used to improve the output voltage regulation of the plurality of power generators; and using one of the digital communications buses to pass voltage harmonic correction information calculated by the master unit to the slave units where the voltage harmonic correction is used to reduce the output voltage distortion of the plurality of power generators.

11. A method of connecting a plurality of power generators, each power generator having an electronic power converter output where the output voltage magnitude and frequency are adjustable, comprising:

connecting in parallel the output voltage terminals of each of the plurality of power generators;

connecting each of the plurality of power generators to a first digital communications bus to provide synchronization of the plurality of power generators; and connecting each of the plurality of power generators to a second digital communications bus to provide load sharing between the plurality of power generators.

12. The method of claim 11 and in addition;

designating one of the plurality of power generators as a master unit and the remainder of the plurality of power generators as slave units to the master unit.

13. The method of claim 12 wherein the power generators are permanent magnet turbogenerators.

14. The method of claim 12 and in addition;

using the first digital communications bus to pass voltage magnitude correction information calculated by the master unit to the slave units where the voltage correction is used to improve the output voltage regulation of the plurality of power generators.

15. The method of claim 12 and in addition;

using the second digital communications bus to pass voltage magnitude correction information calculated by the master unit to the slave units where the voltage correction is used to improve the output voltage regulation of the plurality of power generators.

16. The method of claim 12 and in addition;

using the first digital communications bus to pass voltage harmonic correction information calculated by the master unit to the slave units where the voltage harmonic correction is used to reduce the output voltage distortion of the plurality of power generators.

17. The method of claim 12 and in addition;

using the second digital communications bus to pass voltage harmonic correction information calculated by the master unit to the slave units where the voltage harmonic correction is used to reduce the output voltage distortion of the plurality of power generators.

18. The method of claim 12 and in addition;

using the first digital communications bus to pass voltage magnitude correction information calculated by the master unit to the slave units where the voltage correction is used to improve the output voltage regulation of the plurality of power generators; and using the second digital communications bus to pass voltage harmonic correction information calculated by the master unit to the slave units where the voltage harmonic correction is used to reduce the output voltage distortion of the plurality of power generators.

19. The method of claim 12 and in addition;

using the second digital communications bus to pass voltage magnitude correction information calculated by the master unit to the slave units where the voltage correction is used to improve the output voltage regulation of the plurality of power generators; and using the first digital communications bus to pass voltage harmonic correction information calculated by the master unit to the slave units where the voltage harmonic correction is used to reduce the output voltage distortion of the plurality of power generators.

20. The method of claim 12 and in addition;
employing an output impedance shaping control on the plurality of power generators where the output voltage is reduced with increasing output current.

21. The method of claim 12 and in addition;
employing an output impedance shaping control on the plurality of power generators where the output voltage is reduced with increasing output current; and
using the first digital communications bus to pass voltage magnitude correction information calculated by the master unit to the slave units where the voltage correction is used to improve the output voltage regulation of the plurality of power generators.

22. The method of claim 12 and in addition;
employing an output impedance shaping control on the plurality of power generators where the output voltage is reduced with increasing output current; and
using the second digital communications bus to pass voltage magnitude correction information calculated by the master unit to the slave units where the voltage correction is used to improve the output voltage regulation of the plurality of power generators.

23. The method of claim 12 and in addition;
employing an output impedance shaping control on the plurality of power generators where the output voltage is reduced with increasing output current; and
using the first digital communications bus to pass voltage harmonic correction information calculated by the master unit to the slave units where the voltage harmonic correction is used to reduce the output voltage distortion of the plurality of power generators.

24. The method of claim 12 and in addition;
employing an output impedance shaping control on the plurality of power generators where the output voltage is reduced with increasing output current; and
using the second digital communications bus to pass voltage harmonic correction information calculated by the master unit to the slave units where the voltage harmonic correction is used to reduce the output voltage distortion of the plurality of power generators.

25. The method of claim 12 and in addition;
employing an output impedance shaping control on the plurality of power generators where the output voltage is reduced with increasing output current;
using the first digital communications bus to pass voltage magnitude correction information calculated by the master unit to the slave units where the voltage correction is used to improve the output voltage regulation of the plurality of power generators; and
using the second digital communications bus to pass voltage harmonic correction information calculated by the master unit to the slave units where the voltage harmonic correction is used to reduce the output voltage distortion of the plurality of power generators.

26. The method of claim 12 and in addition;
employing an output impedance shaping control on the plurality of power generators where the output voltage is reduced with increasing output current;
using the second digital communications bus to pass voltage magnitude correction information calculated by the master unit to the slave units where the voltage correction is used to improve the output voltage regulation of the plurality of power generators; and
using the first digital communications bus to pass voltage harmonic correction information calculated by the master unit to the slave units where the voltage harmonic correction is used to reduce the output voltage distortion of the plurality of power generators.

27. A method of connecting a plurality of permanent magnet turbogenerators, each permanent magnet turbogenerator having an electronic power converter output where the output voltage magnitude and frequency are adjustable, comprising:
connecting in parallel the output voltage terminals of each of the plurality of permanent magnet turbogenerators;
connecting each of the plurality of permanent magnet turbogenerators to an Ethernet digital communications bus to provide load sharing between the plurality of permanent magnet turbogenerators; and
connecting each of the plurality of permanent magnet turbogenerators to a digital serial communications interface bus to provide synchronization of the plurality of permanent magnet turbogenerators.

28. The method of claim 27 and in addition;
designating one of the plurality of permanent magnet turbogenerators as a master unit and the remainder of the plurality of permanent magnet turbogenerators as slave units to the master unit.

29. The method of claim 28 and in addition;
employing an output impedance shaping control on the plurality of power generators where the output voltage is reduced with increasing output current.

30. A power generating system, comprising;
a plurality of power generators each having an electronic power converter output with adjustable output voltage magnitude and frequency;
an electric power output load connecting the output voltage terminals of each of said plurality of power generators; and
at least one digital communications bus operably connecting each of said plurality of power generators to provide synchronization and load sharing between said plurality of power generators.

31. The power generating system of claim 30 wherein said power generators are permanent magnet turbogenerators and said at least one digital communications bus includes an Ethernet digital communications bus to provide load sharing between the plurality of permanent magnet turbogenerators and a digital serial communications interface bus to provide synchronization of the plurality of permanent magnet turbogenerators.

* * * * *